(12) United States Patent
Kusano

(10) Patent No.: US 9,554,192 B2
(45) Date of Patent: Jan. 24, 2017

(54) INFORMATION TERMINAL SYSTEM

(71) Applicant: Alpine Electronics, Inc., Tokyo (JP)

(72) Inventor: Manabu Kusano, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 164 days.

(21) Appl. No.: 14/076,424

(22) Filed: Nov. 11, 2013

(65) Prior Publication Data
US 2014/0173664 A1  Jun. 19, 2014

(30) Foreign Application Priority Data

Dec. 17, 2012  (JP) ................................. 2012-274304

(51) Int. Cl.
| G06F 13/00 | (2006.01) |
|---|---|
| G06F 3/00 | (2006.01) |
| H04N 5/445 | (2011.01) |
| H04N 21/482 | (2011.01) |
| H04N 21/472 | (2011.01) |
| H04N 21/61 | (2011.01) |
| H04N 21/462 | (2011.01) |

(52) U.S. Cl.
CPC ........ *H04N 21/482* (2013.01); *H04N 21/4622* (2013.01); *H04N 21/47214* (2013.01); *H04N 21/6175* (2013.01)

(58) Field of Classification Search
CPC .............. H04N 21/478; H04N 21/4782; H04N 21/47214; H04N 21/482
See application file for complete search history.

(56) References Cited

U.S. PATENT DOCUMENTS

2009/0271826 A1  10/2009  Lee et al.

FOREIGN PATENT DOCUMENTS

| JP | 2008-236236 | 10/2008 |
|---|---|---|
| JP | 2009-065266 | 3/2009 |
| JP | 2011-522455 | 7/2011 |
| JP | 2012-065054 | 3/2012 |
| JP | 2012-070178 | 4/2012 |
| JP | 2012-105006 | 5/2012 |
| JP | 2012-150662 | 8/2012 |
| JP | 2012-239149 | 12/2012 |

OTHER PUBLICATIONS

Notification of Reasons for Refusal for JP2012-274304 dispatched Sep. 6, 2016, 8 pages including English translation.

*Primary Examiner* — Hunter B Lonsberry
(74) *Attorney, Agent, or Firm* — Brinks Gilson & Lione

(57) ABSTRACT

When a user selects a topic tag included in a posted article on a display of a timeline obtained from an SNS server, an SNS client looks up an information channel related word table registering correspondence between a TV channel and a term related to the TV channel, searches a TV channel registering correspondence with a term and the topic tag, and causes the TV control to receive the searched TV channel and display and output the received program.

5 Claims, 7 Drawing Sheets

| SOURCE | INFORMATION CHANNEL | RELATED WORD |
|---|---|---|
| TV | 1ch | 1ch, MHK,.... |
| | ⋮ | ⋮ |
| | 4ch | 4ch, MTV, AX, MITTELE,...,ECT |
| | ⋮ | ⋮ |
| WWW | http://www.redsportstube | redsports, rslive |
| | http://mytube.com/live | mytube, mytubelive |
| | ⋮ | ⋮ |

INFORMATION CHANNEL RELATED WORD TABLE

| TIME \ TV CHANNEL INFORMATION | 1ch/MHK | ........ | 4ch/ECT | ........ |
|---|---|---|---|---|
| 13:00 | 00 SUCCESSIVE QUIZ | ⋮ | 00 IT'S LUNCH TIME | ⋮ |
| | 27 HELLO FROM PARK | | | |
| 14:00 | ⋮ | ⋮ | 00 NIYANEYA | ⋮ |
| ⋮ | ⋮ | ⋮ | ⋮ | ⋮ |

EPG DATA

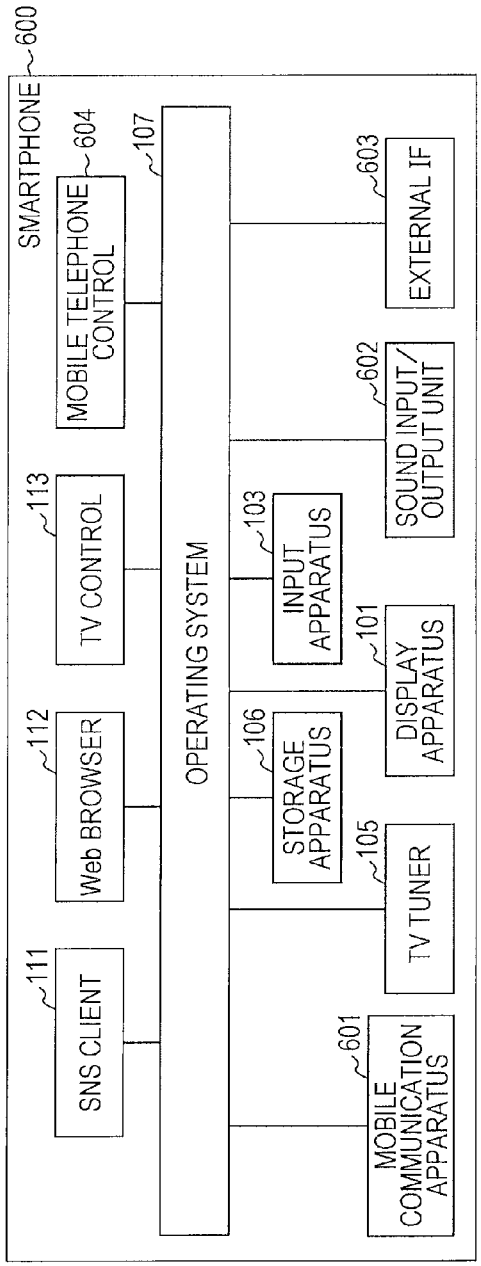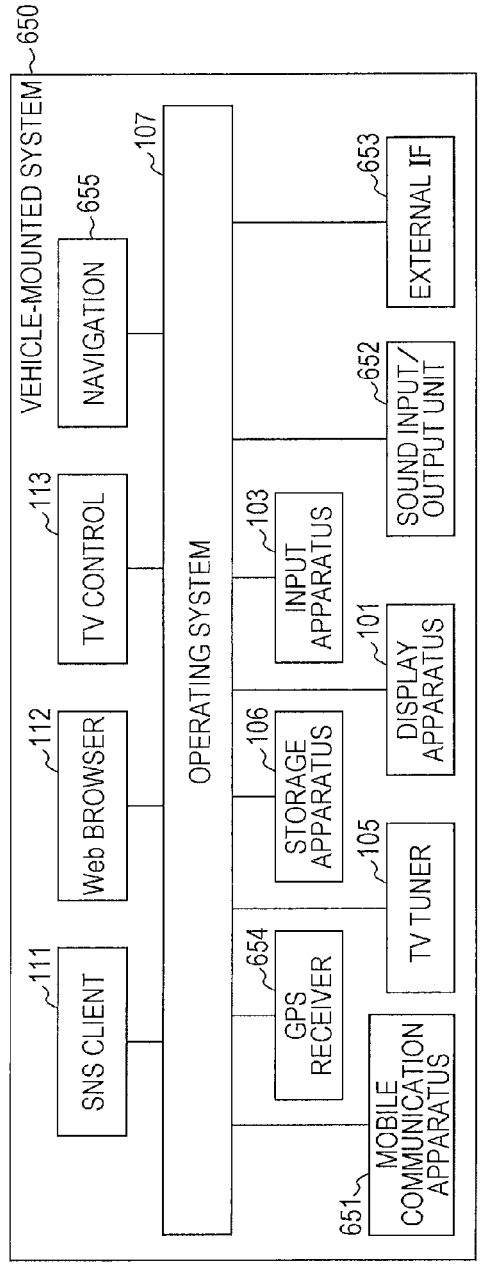

INFORMATION TERMINAL SYSTEM

RELATED APPLICATION

The present application claims priority to Japanese Patent Application Number 2012-274304, filed Dec. 17, 2012, the entirety of which is hereby incorporated by reference.

BACKGROUND

1. Field of the Invention

The present invention relates to a technique for supporting use of information related to a posted article in a posting system for disclosing posted articles.

2. Description of the Related Art

A technique for supporting use of information related to a posted article in a posting system for disclosing posted articles such as SNS (social networking service) includes, for example, as disclosed by Japanese Patent Laid-Open No. 2012-150662, a technique for searching other articles including a keyword using, as the keyword, a partially matching portion where a word included in a posted article matches a word included in a TV program table.

Another technique includes, for example, as disclosed by Japanese Patent Laid-Open No. 2009-65266, a technique used by a TV apparatus to automatically switch the reception channel to a channel broadcasting a program related to a keyword designated by a user.

When a user viewing a posted article that is posted to a posting system obtains information which is discussed in the posted article, the user himself/herself needs to identify an information channel in which the information is provided, access the identified information channel, and do complicated work of obtaining the information.

More specifically, for example, when information which is discussed in the posted article is a TV program, the user must check the TV channel on which the TV program is broadcast by referring to the TV program table and do complicated work of switching to the TV channel which the user has checked the reception TV channel of the TV apparatus in order to view the TV program.

Therefore, it is an object of embodiments of the present invention to allow a user to easily obtain information discussed in a posted article that is posted to a posting system.

SUMMARY

In order to achieve the above object, an embodiment of the present invention provides an information terminal system including a client configured to obtain an article from an external server by accessing, via communication, the external server that accepts posting of an article and discloses the article which has been received for posting, and display the obtained article, a broadcast reception unit configured to receive a broadcast channel that is set as a reception channel among broadcast channels on which programs are distributed and output it to a user, and a related information output control unit configured to determine a broadcast channel related to a term included in an article displayed by the client, and set the determined broadcast channel as the reception channel with the broadcast reception unit.

In this case, the information terminal system may be configured such that the client obtains multiple articles from the server and displays an article display screen in which the obtained articles are arranged on the display apparatus, and the related information output control unit determines a broadcast channel related to a term included in the article selected by a user on the article display screen and sets the determined broadcast channel as the reception channel with the broadcast reception unit.

Alternatively, the information terminal system may be configured such that the article includes a tag which is a term representing a target discussed in the article, the client displays an article display screen in which the article obtained from the server is arranged on the display apparatus, and the related information output control unit determines a broadcast channel related to the tag selected by the user on the article screen and sets the determined broadcast channel as the reception channel.

The information terminal system may further includes a storage unit storing a correspondence table registering correspondence between the term and the broadcast channel related to the term with regard to each of multiple terms, and the related information output control unit may determine the broadcast channel of which correspondence with the term included in the article is registered in the correspondence table, as the broadcast channel related to the term.

In this case, the information terminal system may further include a plurality of correspondence tables provided in which each corresponds to a region, a current position calculation unit may be configured to calculate a current position, a broadcast channel in which correspondence with the term is registered in each of the correspondence tables may be a broadcast channel that can be received in the region corresponding to the correspondence table, and the related information output control unit may determine a broadcast channel in which the correspondence with the term included in the article is registered in the correspondence table provided in correspondence with the region including the current position calculated by the current position calculation unit, as the broadcast channel related to the term.

The information terminal system may further include a storage unit storing an electronic program table registering, with regard to multiple broadcast channels, distribution information representing identification information about the broadcast channel and a distribution schedule of a program, and the related information output control unit may determine the broadcast channel in which the term included in the article in the electronic program table is included in the distribution information, as the broadcast channel related to the term.

In this case, in the information terminal system, the broadcast may be a television broadcast, and the broadcast channel is a television channel on which a television program is distributed. The broadcast may be a radio broadcast, and the broadcast channel may be a radio channel on which a radio program is distributed.

According to the information terminal system explained above, when an article discussing a program that is broadcast on a broadcast channel includes a term related to the broadcast channel, then the broadcast channel may be received and output by the broadcast reception unit. Therefore, the user can easily watch the program discussed in the article.

In order to achieve the above object, an embodiment of the present invention provides an information terminal system including a client configured to obtain an article from an external server by accessing, via communication, the external server that accepts posting of an article and discloses the article which has been received for posting, and display the obtained article, a Web browser configured to obtain content on the Internet and display the content, and a related information output control unit configured to determine content related to a term included in an article displayed by the client and causes the Web browser to obtain and display the determined content.

In this case, the information terminal system may be configured such that the client obtains multiple articles from the server and displays an article display screen in which the obtained articles are arranged on the display apparatus, and the related information output control unit determines content related to a term included in the article selected by a user on the article display screen, and causes the Web browser to obtain and display the determined content.

Alternatively, the information terminal system may be configured such that the article includes a tag which is a term representing a target discussed in the article, the client displays an article display screen in which the article obtained from the server is arranged on the display apparatus, and the related information output control unit determines content related to the tag selected by the user on the article screen and causes the Web browser to obtain and display the determined content.

In each information terminal system explained above, the information terminal system may further include a storage unit storing a correspondence table registering correspondence between the term and the content related to the term with regard to each of multiple terms, and the related information output control unit may determine the content of which correspondence with the term included in the article is registered in the correspondence table, as the content related to the term, and cause the Web browser to obtain and display the calculated and determined content.

In the above information terminal system, the content may be a Web page. According to the information terminal system, when an article discussing content on the Internet includes a term related to the content, the content can be obtained and displayed by the Web browser. Therefore, the user can easily view the content on the Internet discussed in the article.

In this case, an embodiment of the present invention further provides an information terminal system including a client configured to obtain an article from an external server by accessing, via communication, the external server that accepts posting of an article and discloses the article which has been received for posting, and display the obtained article, a broadcast reception unit configured to receive a broadcast channel which is set as a reception channel from among broadcast channels distributing programs and performs output, a storage unit storing an electronic program table representing a program name and a distribution schedule of each program distributed in each broadcast channel, a scheduling program processing unit configured to record a program of which a schedule is registered or support a user to view a program of which a schedule is registered, and a program scheduling unit configured to determine, from the electronic program table, a program of which a distribution schedule is a time after a current time and of which a program name is related to a term included in the article displayed by the client, and register the schedule of the determined program to the scheduling program processing unit.

In this case, in the information terminal system, the client may obtain multiple articles from the server and display an article display screen in which the obtained articles are arranged on the display apparatus, and the program scheduling unit may determine a program related to a term included in the article selected by a user on the article display screen, and register the schedule of the determined program to the scheduling program processing unit.

Alternatively, when the article includes a tag which is a term representing a target discussed in the article, the information terminal system may be configured such that the client displays an article display screen in which the articles obtained from the server are arranged on the display apparatus, and the program scheduling unit determines a program related to a tag selected by a user on the article display screen and registers the schedule of the determined program to the scheduling program processing unit.

According to such an information terminal system, when an article discussing a program that is broadcast on a broadcast channel includes a term related to the program, recording or viewing of the program can be registered. Therefore, the user can easily record and watch the program discussed in the article.

As described above, according to the present invention, a user can easily obtain information discussed in a posted article that is posted to a posting system.

BRIEF DESCRIPTION OF THE DRAWINGS

FIGS. 2*a*1 to 2*c*2 are figures illustrating an example of displays of a complex information terminal system according to an embodiment of the present invention;

FIGS. 4*a*1 to 4*b*2 are figures illustrating user interfaces for receiving search keys according to an embodiment of the present invention;

FIGS. 6A and 6B are block diagrams illustrating another example of a configuration of a complex information terminal system according to an embodiment of the present invention.

DETAILED DESCRIPTION OF THE PREFERRED EMBODIMENTS

An embodiment of the present invention will be hereinafter explained.

Figure 1:
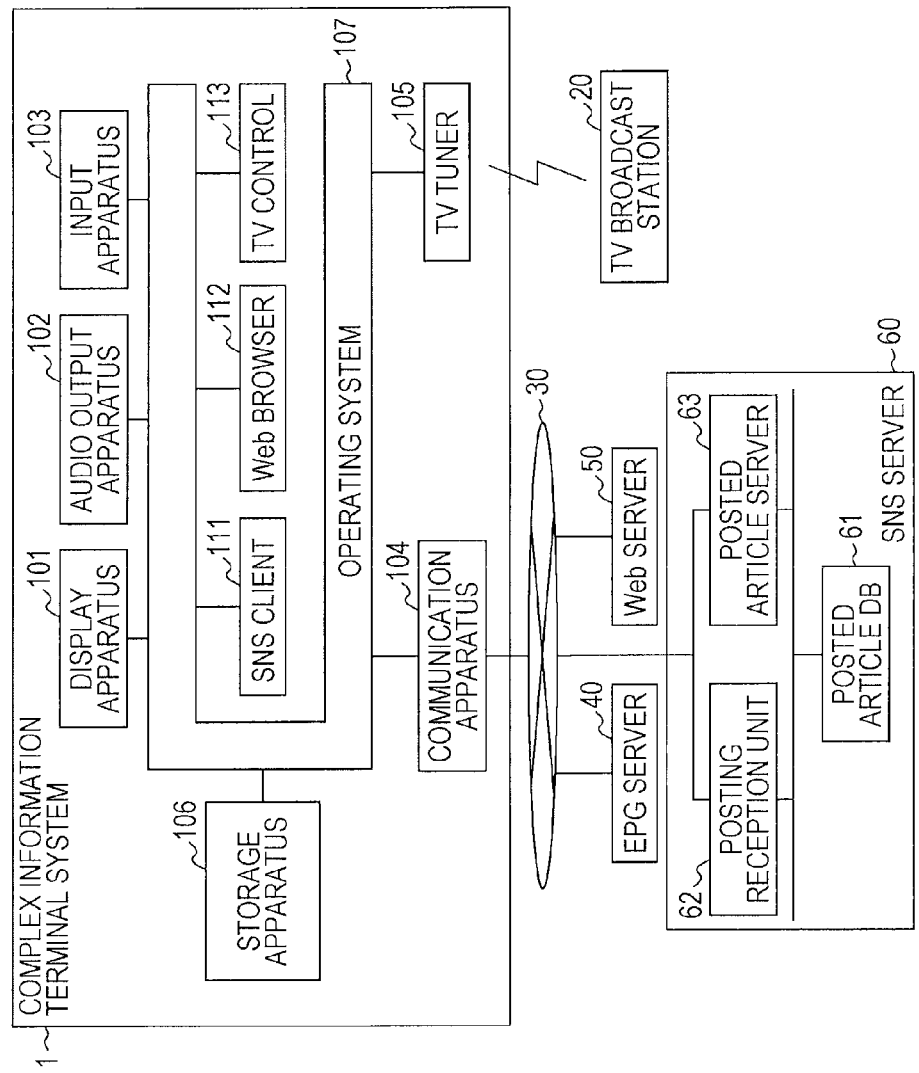
FIG. 1 is a block diagram illustrating a configuration of a complex information terminal system according to an embodiment of the present invention.

FIG. 1 illustrates a configuration of a complex information terminal system according to the present embodiment. As illustrated in the figure, a complex information terminal system 1 includes a display apparatus 101, an audio output apparatus 102, an input apparatus 103, a communication apparatus 104, a TV tuner 105, a storage apparatus 106, an operating system 107, and multiple applications operating on the operating system 107 and managed by the operating system 107. Further, the complex information terminal system 1 includes an SNS client 111, a Web browser 112, a TV control 113, and the like, which are applications operating on the operating system 107. In this case, each application can use the functions of the display apparatus 101, the audio output apparatus 102, the input apparatus 103, the communication apparatus 104, the TV tuner 105, and the storage apparatus 106 by means of the operating system 107.

The complex information terminal system 1 may be constituted using a computer using a CPU, a memory, and the like in terms of hardware, and the operating system 107, each application, and the like are achieved by causing the computer to execute a predetermined computer program.

In such a configuration, the TV tuner 105 receives a TV program that is broadcast in a TV channel which is set as the reception channel in the TV broadcast that is broadcast from the TV broadcast station 20. The TV control 113 controls switching of the reception channel of the TV tuner 105 and output of the TV program received in the reception channel by the TV tuner 105 to the display apparatus 101 and the audio output apparatus 102. The TV control 113 also performs a processing of obtaining the electronic program table and storing it to the storage apparatus 106, and displaying the electronic program table stored in the storage apparatus 106 on the display apparatus 101. In this case, the electronic program table can be obtained by causing the TV tuner 105 to receive an electronic program table that is broadcast from the TV broadcast station 20.

Alternatively, the electronic program table can also be obtained by accessing the EPG server 40 distributing the electronic program table arranged on the Internet 30 via the communication apparatus 104. Subsequently, the Web browser 112 accesses the Web server 50 on the Internet 30 via the communication apparatus 104, controls output Web content (Web pages, motion pictures, images) distributed by the Web server 50 to the display apparatus 101 and the audio output apparatus 102.

The SNS client 111 is a client of SNS (Social Networking Service) provided by the SNS server 60 arranged on the Internet 30. In this case, as illustrated in the figure, the SNS server 60 includes a posted article database 61 accumulating posted articles, a posting reception unit 62 receiving postings of posted articles from the SNS client 111 and storing them to the posted article database 61, a posted article server 63 reading a posted article group, which is requested by the SNS client 111 to be viewed, from the posted article database 61 and transmitting a timeline obtained by arranging the posted articles of the posted article group thus read in the order of posting time to the SNS client 111, and the like.

Figure 2:
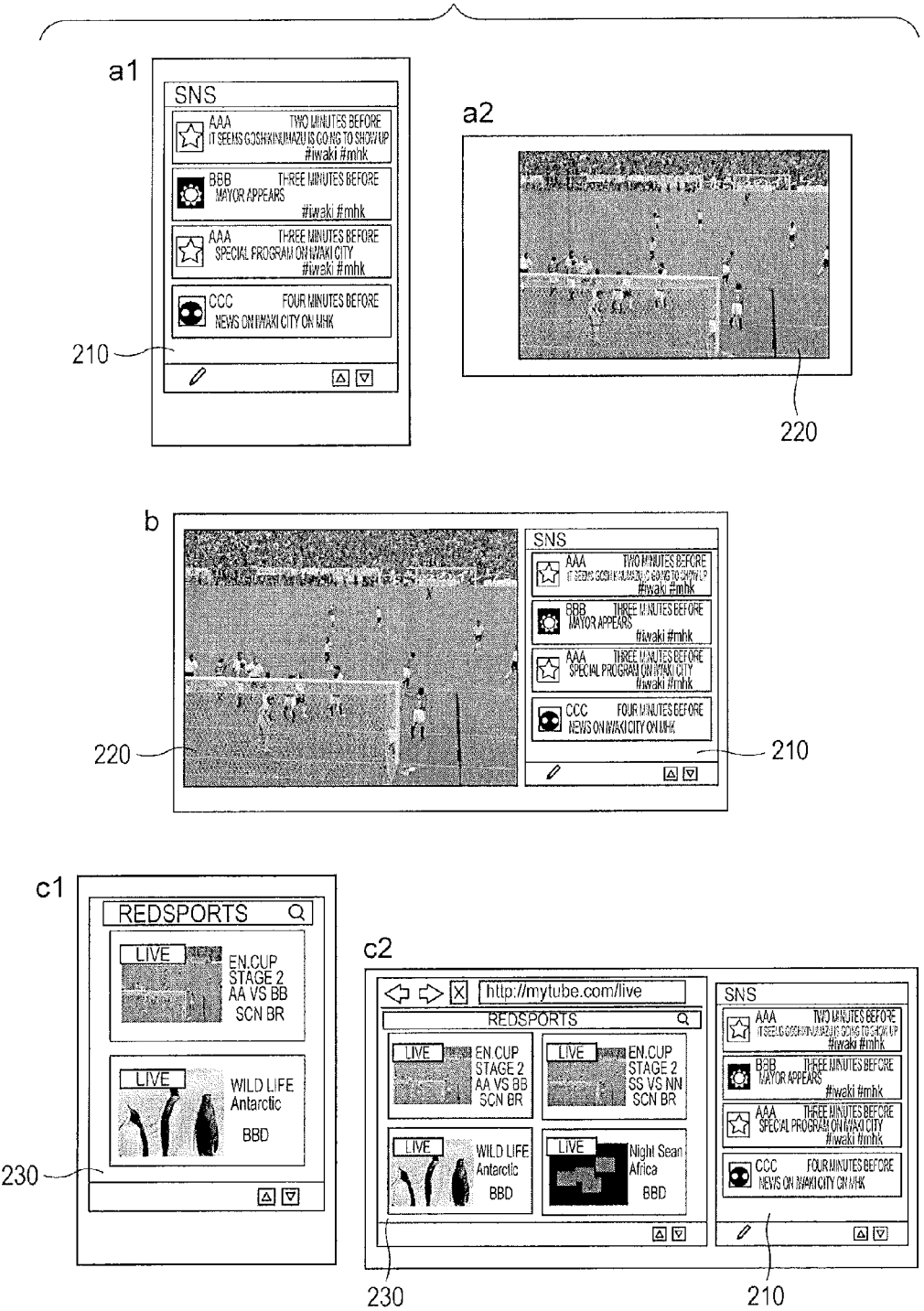

The SNS client 111 accesses the SNS server 60 via the communication apparatus 104 and the Internet 30, and controls display and the like of the timeline sent from the SNS server 60 and the postings of the posted articles to the SNS server 60 on the display apparatus 101. The display of the timeline on the display apparatus 101 by the SNS client 111 and the display of the TV program on the display apparatus 101 by the TV control 113 may be done in such a manner that, as shown in the display of the timeline 210 of FIG. 2*a*1 and the display of the TV program 220 of FIG. 2*a*2, each of the displays may be shown using the entire space of the display screen of the display apparatus 101, or as shown in FIG. 2*b*, the display of the timeline 210 and the display of the TV program 220 may be shown at the same time using two divided screens which are obtained by dividing the display screen of the display apparatus 101.

The information channel related word table and the EPG data stored in the storage apparatus 106 of the complex information terminal system 1 explained above will now be explained.

Figures 3A, 3B:
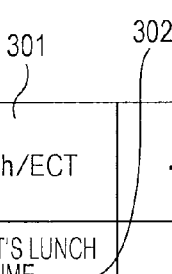
FIGS. 3A and 3B are figures illustrating an information channel related word table and EPG data used in an embodiment of the present invention.

As shown in FIG. 3A, in the information channel related word table, information about each information channel is registered in such a manner that a TV channel or a Web page is treated as a piece of information channel. The registered information about each information channel includes the source of the information channel, the address of the information channel, and related words. In the source of the information channel, TV is registered when the information channel is a TV channel, and WWW is registered when the information channel is a Web page. In the address of the information channel, information is registered as follows. When the information channel is a TV channel, a remote control key ID of the TV channel (a remote control number with which the broadcast channel is allocated in the TV receiver) is registered, and when the information channel is a Web page, the URL of the Web page is registered. In the related word of the information channel, one or more words used to represent the information channel are registered. For example, for an information channel which is a TV channel of which the remote control key ID is 1 ch, and the broadcast station name broadcasting in the TV channel is MHK, "1 ch" and "MHK" are registered as the related words. For an information channel which is a Web page doing live video distribution of sports games with a service name "redsports", the name "redsports" and the like are registered as the related words.

As illustrated in FIG. 3B, the EPG data are data of the electronic program table obtained by the TV control 113. As illustrated in the figure, with regard to each TV channel on which broadcast is performed, the EPG data are registered with TV channel information 301, including the remote control key ID of the TV channel and the broadcast station name broadcasting on the TV channel, and program information 302 representing the title and the contents of programs in each time zone that are broadcast on the TV channel.

Now an operation for automatically outputting information about an information channel related to a posted article that is performed by the SNS client 111 with such a configuration will be explained.

Figure 4:
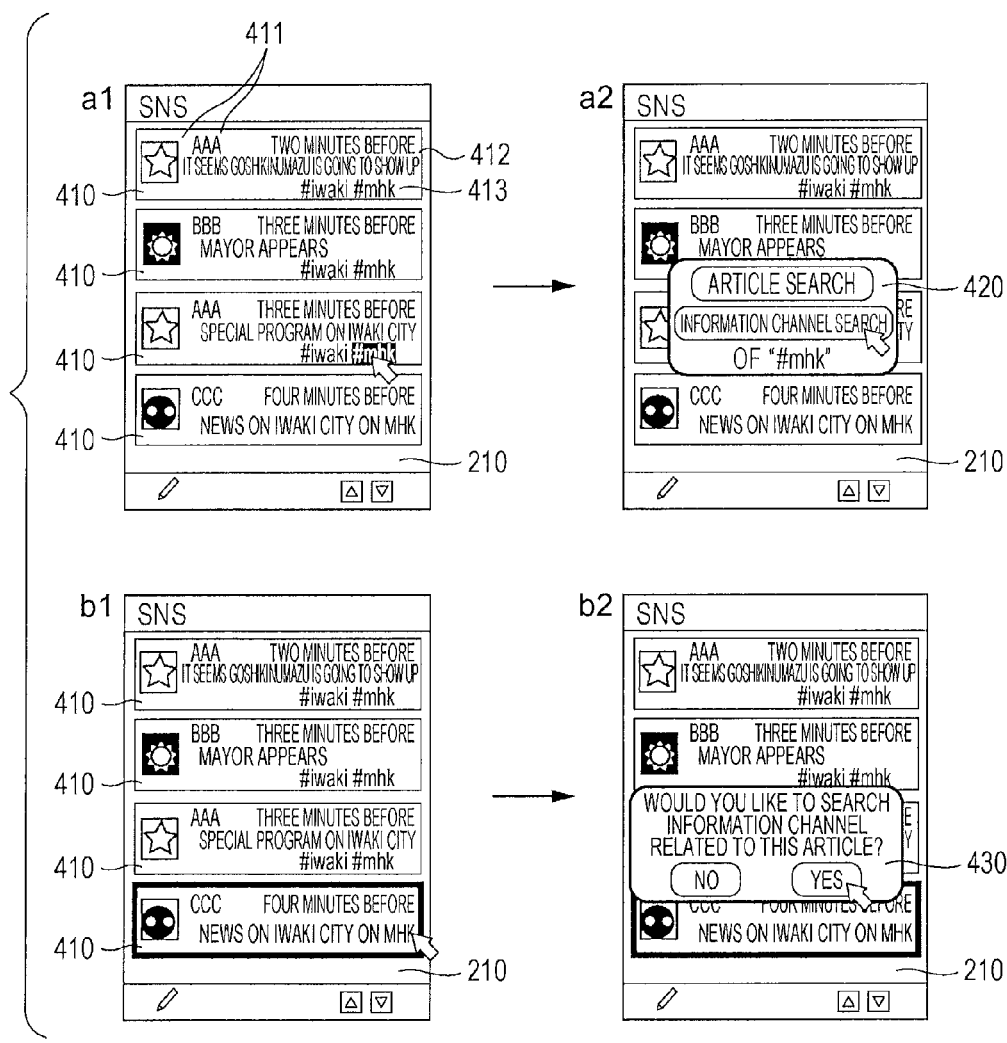

As illustrated in FIG. 2*a*1 or FIG. 2*b*, the timeline 210 obtained by the SNS client 111 from the SNS server 60 and displayed on the display apparatus 101 is made by arranging multiple posted articles 410 which may also be referred to as "tweets" and the like in such an order that those with newer posting times are arranged at the upper side as illustrated in FIG. 4*a*1, and each posted article 410 may include not only identification information 411 of the poster and a posted text 412 but also a topic tag 413 which is also referred to as a hash tag and the like. In this case, the topic tag 413 is a term representing a topic discussed in the posted text 412 and functions as an identifier of a group of posted articles 410 discussing the same topic.

When a user selects a topic tag 413 included in any one of posted articles 410 on the display of the timeline 210 as illustrated in FIG. 4*a*1, an inquiry window 420 is displayed as illustrated in FIG. 4*a*2, so that the user is asked to select whether to perform an article search or information channel search. Then, when the article search is designated in the inquiry window 420, a search request of posted articles 410 with the selected topic tag 413 being the search key is transmitted to the SNS server 60, and the timeline of the posted articles 410 including the selected topic tag 413 is obtained, whereby the timeline displayed on the display apparatus 101 is updated with the obtained timeline. In this case, the posted article server 63 of the SNS server 60 receives the search request of posted articles 410 with the selected topic tag 413 being the search key, a predetermined number of posted articles 410 including the topic tag 413 as the search key are extracted from the posted article database 61, and the timeline obtained by arranging the extracted posted articles 410 in the order of posting time is transmitted to the SNS client 111 of the search request source.

On the other hand, when the information channel search is designated in the inquiry window 420 as illustrated in FIG. 4a2, the SNS client 111 activates and executes information channel output processing explained later using the selected topic tag 413 as the search key.

As illustrated in FIG. 4b1, when the user selects any one of the posted articles 410 on the display of the timeline 210, the SNS client 111 displays the inquiry window 430 as illustrated in FIG. 4b2 to ask the user whether to perform the information channel search or not. When the information channel search is designated in the inquiry window 430 as illustrated in FIG. 4b2, the SNS client 111 activates and executes information channel output processing explained later using the selected posted article 410 as the search key.

Now, the information channel output processing activated as described above will be explained.

Figure 5:
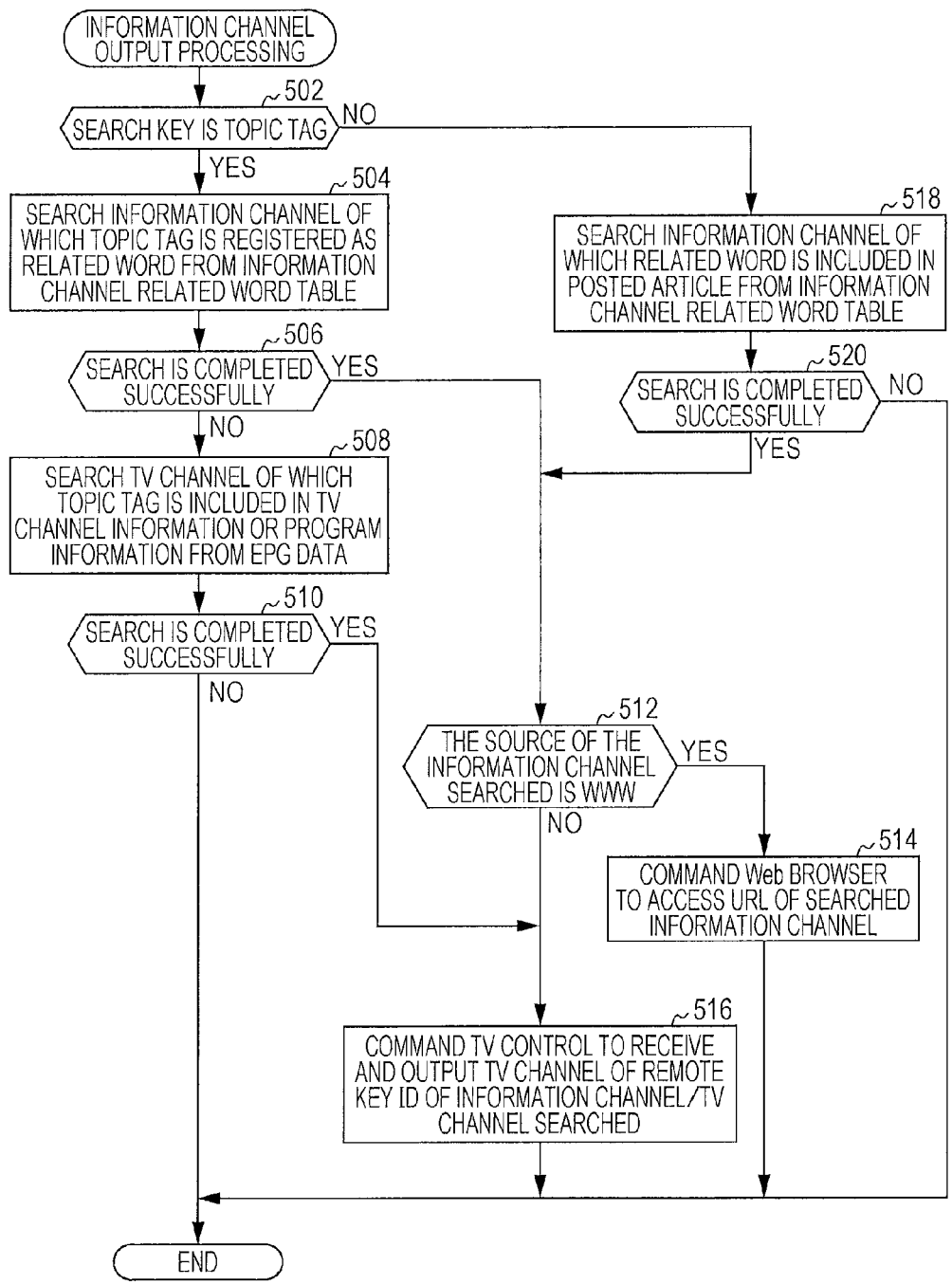
FIG. 5 is a flowchart illustrating information channel output processing according to an embodiment of the present invention.

FIG. 5 illustrates a procedure of this information channel output processing. As illustrated in the figure, in this processing, a determination first is made as to whether the search key is a topic tag 413 or a posted article 410 (step 502).

When the search key is a topic tag 413 (step 502), first, an information channel in which the topic tag 413 as the search key is registered as a related word is searched from the information channel related word table (step 504). Then, a determination is made as to whether the information channel in which the topic tag 413 as the search key is registered as a related word is successfully searched or not (step 506). If the search is successful (step 506), a determination is made as to whether the source of the searched information channel is TV or WWW (step 512). When it is WWW, the Web browser 112 is requested to access the address of the searched information channel (URL of Web page in this case) (step 514), and the processing is terminated. In this case, the Web browser 112 which is requested to access the address (URL) of the information channel which is the Web page accesses the requested URL on the Web server 50 via the communication apparatus 104 and the Internet 30, obtains the Web page at the URL, and, for example, displays the obtained Web page 230 on the display apparatus 101 as illustrated in FIG. 2c1 or FIG. 2c2.

On the other hand, when the source of the searched information channel is not WWW but is TV (step 512), the TV control 113 is requested to switch the reception channel to the TV channel of the address of the searched information channel (the remote control key ID of the TV channel in this case) (step 516), and the processing is terminated. In this case, the TV control 113 requested to switch the reception channel controls the TV tuner 105, and controls the start of reception of the TV channel corresponding to the remote control key ID of the switched reception channel and display of the TV program 220 received on the TV channel as shown in FIG. 2a2 and FIG. 2b.

If the topic tag 413 is determined to have failed to be searched from the information channel related word table of the information channel registered as a related word in step 506, a TV channel including the same term as the topic tag 413 serving as the search key in the TV channel information 301 or the program information 302 is searched from the electronic program table represented by the EPG data (step 508). Then, a determination is made as to whether the topic tag 413 being the search key can be searched from the electronic program table or not (step 510).

When the TV channel including the same term as the topic tag 413 being the search key cannot be searched from the electronic program table (step 510), the processing is terminated without further processing. On the other hand, when the TV channel including the same term as the topic tag 413 being the search key in the TV channel information 301 or the program information 302 can be searched from the electronic program table (step 510), the TV control 113 is requested to switch the reception channel to the TV channel of the remote control key ID of the TV channel (step 516), and the processing is terminated.

If the search key is determined to be the posted article 410 in step 502, a search is performed to determine whether the related word registered to any one of the information channels of the information channel related word table is included in the posted article 410 as the search key (step 518). Then, a determination is made as to whether the search is completed successfully (step 520), and when failed, the processing is terminated. On the other hand, when the search is completed successfully (step 520), a determination is made as to whether the source of the information channel in which the related word included in the posted article 410 as the search key is registered is TV or WWW (step 512). When it is WWW, the Web browser 112 is requested to access the address (in this case, URL) of the information channel in which the related word included in the posted article 410 as the search key is registered (step 514), and the processing is terminated. On the other hand, when the source of the information channel in which the related word included in the posted article 410 as the search key is registered is not WWW but TV (step 512), the TV control 113 is requested to switch the reception channel to the TV channel of the address (in this case, the remote control key ID of the TV channel) of the information channel in which the related word included in the posted article 410 as the search key is registered (step 516), and the processing is terminated.

The information channel output processing and an embodiment of the present invention have been explained above.

In the above embodiment, the TV control 113 is provided with the functions of recording TV programs which are registered for scheduled recording and supporting viewing of TV programs registered for scheduled viewing, but the SNS client 111 may also perform scheduled recording and scheduled viewing of TV programs to the TV control 113 using the posted article. More specifically, the SNS client 111 displays buttons for receiving commands of "scheduled recording" and "scheduled viewing" on the inquiry window 420 as illustrated in FIG. 4a2 that is displayed when the user selects the topic tag 413 included in the posted article 410 as described above, and when "scheduled recording" is commanded, the program information 302 of which broadcast time zone is after the current time and which includes the term that is close to the selected topic tag 413 in a form of, e.g., a full match or partial match is extracted from the electronic program table represented by the EPG data. Then, when the search is successfully completed, the scheduled recording of the program of the searched program information is registered to the TV control 113. Likewise, when "scheduled viewing" is designated with the inquiry window 420, the SNS client 111 searches the program information 302 of which broadcast time zone is after the current time and which includes the term that is close to the selected topic tag 413 in a form of, e.g., a full match or partial match, from the electronic program table represented by the EPG data. Then, when the search is successfully completed, the scheduled viewing of the program of the searched program information is registered to the TV control 113.

Further, the SNS client 111 may display buttons for receiving commands of "scheduled recording" and "scheduled viewing" on the inquiry window 430 as illustrated in FIG. 4b2 that is displayed when the user selects the posted article 410 as described above, and receive each command. In this case, when "scheduled recording" is commanded in the inquiry window 430, the SNS client 111 searches the program information 302 of which broadcast time zone is after the current time and which includes the term that is close to the selected posted article 410 in a form of, e.g., a full match or partial match from the electronic program table represented by the EPG data, and when the search is successfully completed, the scheduled recording of the program of the searched program information is registered to the TV control 113. Likewise, when "scheduled viewing" is commanded in the inquiry window 430, the SNS client 111 searches the program information 302 of which broadcast time zone is after the current time and which includes the term that is close to the selected posted article 410 in a form of, e.g., a full match or partial match from the electronic program table represented by the EPG data, and when the search is successfully completed, the scheduled viewing of the program of the searched program information is registered to the TV control 113.

The recording of the TV program registered for the scheduled recording is done as follows. The TV control 113 refers to the EPG data, causes the TV tuner 105 to receive the TV program recorded for the scheduled recording during broadcast of the TV program registered for the scheduled recording, and stores the program data of the TV program received to the storage apparatus 106. The support of viewing of the TV program registered for the scheduled viewing is done as follows, for example. The TV control 113 refers to the EPG data, switches the reception channel of the TV tuner 105 to the TV channel on which the TV program registered for the scheduled viewing is broadcast when the TV program registered for the scheduled viewing is started to be broadcast, and outputs a message indicating that the TV program for the scheduled viewing is started to be broadcast when the TV program registered for the scheduled viewing is started to be broadcast.

In this case, the complex information terminal system 1 having the configuration as illustrated in FIG. 1 may also be implemented as a multi-function TV apparatus, also referred to as a smart TV.

The complex information terminal system 1 as shown in the present embodiment may be implemented on a smartphone (multi-function mobile telephone) or a vehicle-mounted system. More specifically, when implemented on a smartphone, as illustrated in FIG. 6A, a smartphone 600 includes the display apparatus 101, the input apparatus 103, the TV tuner 105, the storage apparatus 106, the operating system 107, the SNS client 111, the Web browser 112, the TV control 113, a mobile communication apparatus 601 for accessing a mobile telephone network, a sound input/output unit 602 for inputting/outputting sound, an external interface 603, a mobile telephone control 604 which is an application for causing the smartphone 600 to function as a mobile telephone, and the like. The mobile communication apparatus 601 may be used instead of the communication apparatus 104 of FIG. 1, and the sound input/output unit 602 may be used instead of the audio output apparatus 102 of FIG. 1.

When implemented on a vehicle-mounted system, as illustrated in FIG. 6B, a vehicle-mounted system 650 includes the display apparatus 101, the input apparatus 103, the TV tuner 105, the storage apparatus 106, the operating system 107, the SNS client 111, the Web browser 112, the TV control 113, a mobile communication apparatus 651 for accessing mobile telephone network, a sound input/output unit 652 for inputting/outputting sound, an external interface 653, a GPS receiver 654, a navigation 655 which is an application for route guidance using the current position calculated with the GPS receiver 654, and the like. The mobile communication apparatus 651 may be used instead of the communication apparatus 104 of FIG. 1, and the sound input/output unit 652 may be used instead of the audio output apparatus 102 of FIG. 1. However, when implemented on the vehicle-mounted system 650, the mobile communication apparatus 651 may not be provided in the vehicle-mounted system 650, and an external mobile communication terminal connected via the external interface 653 (for example, the smartphone 600 and the mobile telephone) may be used instead of the communication apparatus 104 of FIG. 1.

Figure 7:
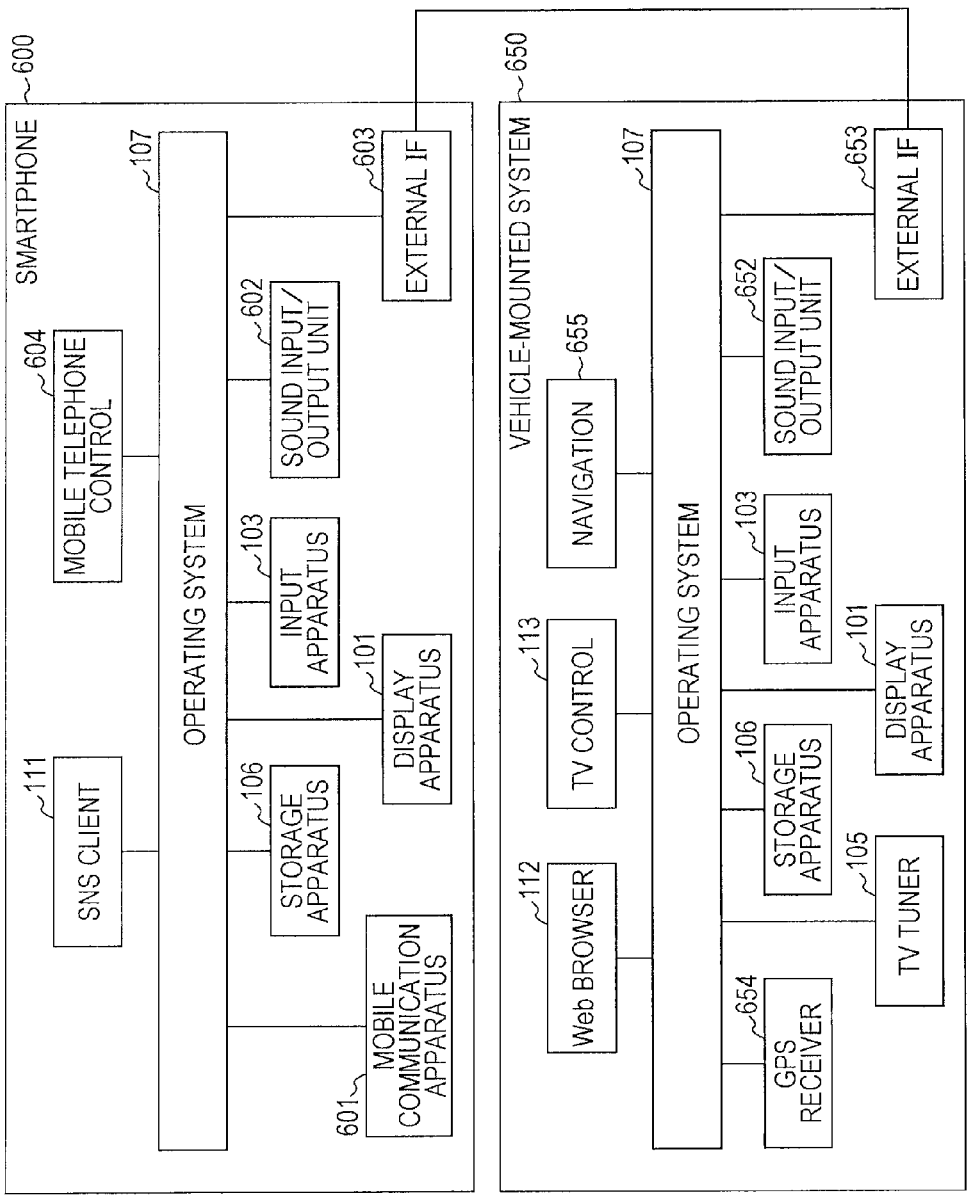
FIG. 7 is a block diagram illustrating another example of a configuration of a complex information terminal system according to an embodiment of the present invention.

The complex information terminal system 1 as described above may be configured by causing the smartphone 600 and the vehicle-mounted system 650 to operate in cooperation. More specifically, as illustrated in FIG. 7, in the configuration of the smartphone 600 and the vehicle-mounted system 650 as illustrated in FIGS. 6A and 6B, the smartphone 600 may not be provided with the TV tuner 105, the TV control 113, and the Web browser 112, and the vehicle-mounted system 650 may not be provided with the mobile communication apparatus 601 and the SNS client 111. Then, in step 514 of the above information channel output processing, the SNS client 111 of the smartphone 600 requests the Web browser 112 of the vehicle-mounted system 650 connected via the external interface 603 to request accessing the information channel which is a Web page, and requests the TV control 113 of the vehicle-mounted system 650 connected via the external interface to request reception output of the information channel which is a TV channel in step 516. The Web browser 112 of the vehicle-mounted system 650 obtains the Web page requested to be accessed by the smartphone 600, and the Web page is displayed on the display apparatus 101 of the vehicle-mounted system 650, and the TV control 113 of the vehicle-mounted system 650 controls reception with the TV tuner 105 on the TV channel requested to be received, and output and display on the display apparatus 101 of the vehicle-mounted system 650.

When the scheduled recording and the scheduled viewing explained above are performed, the scheduled recording and the scheduled viewing are registered to the TV control 113 of the vehicle-mounted system 650 from the SNS client 111 of the smartphone 600.

When the configuration as illustrated in FIG. 7 is employed, the EPG data used in the information channel output processing of the SNS client 111 of the smartphone 600 may be obtained from the EPG server 40 by the SNS client 111 of the smartphone 600 and used, or the EPG data obtained by the TV control 113 of the vehicle-mounted system 650 using the TV tuner 105 may be obtained by the SNS client 111 and used.

In the above embodiment, the TV channel and the Web page are used as the information channel. Alternatively, any broadcast channel such as a channel of a radio broadcast, any content on an interface network (for example, interface network content such as video data and image data), and the like may be used as the information channel.

When the present embodiment is applied to the vehicle-mounted system 650 and a mobile apparatus, the TV channel that can be received by the TV tuner 105 changes in accordance with movement of the vehicle-mounted system 650 and the mobile apparatus. Accordingly, when the present embodiment is applied to a mobile apparatus such as the vehicle-mounted system 650 and the smartphone 600 having a current position calculation function such as a navigation function and the GPS receiver 654, an information channel related word table may be provided for each region in which a set of TV channels can be received therein such as each state or county, and the information channel related word table may be switched and used in accordance with the region which includes the calculated current position.

As described above, according to the present embodiment, when a program that is broadcast on TV or radio and an article discussing the Internet content such as a Web page include a term representing an information channel distributing the topic, the program and the Internet content may be obtained from the information channel, and may be presented to the user. When an article discussing a program that is broadcast on TV or radio includes a term and the like representing the program, scheduled recording and scheduled viewing of the program can be performed. Therefore, a user can easily obtain information discussed in a posted article 410 that is posted to an SNS.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An information terminal system comprising:
    a client configured to obtain an article from an external server by accessing, via communication, the external server that accepts posting of an article and discloses the article which has been posted, and display the obtained article;
    a broadcast reception unit configured to receive a broadcast channel that is set as a reception channel among broadcast channels on which programs are distributed and output it to a user; and
    a related information output control unit configured to determine a broadcast channel related to a term included in an article displayed by the client, and set the determined broadcast channel as the reception channel with the broadcast reception unit, wherein the broadcast is a radio broadcast, and the broadcast channel is a radio channel on which a radio program is distributed.

2. The information terminal system according to claim 1, wherein
    the client obtains multiple articles from the server and displays an article display screen in which the obtained articles are arranged on a display apparatus, and
    the related information output control unit determines a broadcast channel related to a term included in the article selected by a user on the article display screen, and sets the determined broadcast channel as the reception channel with the broadcast reception unit.

3. The information terminal system according to claim 1, wherein
    the article includes a tag which is a term representing a target discussed in the article,
    the client displays an article display screen in which the article obtained from the server is arranged on a display apparatus, and
    the related information output control unit determines a broadcast channel related to the tag selected by the user on the article screen, and the broadcast reception unit sets the determined broadcast channel as the reception channel.

4. The information terminal system according to claim 1 further comprising
    a storage unit storing a correspondence table registering correspondence between the term and the broadcast channel related to the term with regard to each of multiple terms,
    wherein the related information output control unit determines the broadcast channel of which correspondence with the term included in the article is registered in the correspondence table, as the broadcast channel related to the term.

5. The information terminal system according to claim 1 further comprising
    a storage unit storing an electronic program table registering, with regard to multiple broadcast channels, distribution information representing identification information about the broadcast channel and a distribution schedule of a program,
    wherein the related information output control unit determines the broadcast channel in which the term included in the article in the electronic program table is included in the distribution information, as the broadcast channel related to the term.

* * * * *